(12) United States Patent
Nomura et al.

(10) Patent No.: US 7,489,114 B2
(45) Date of Patent: Feb. 10, 2009

(54) HYBRID VEHICLE DRIVE UNIT

(75) Inventors: Shinichi Nomura, Anjo (JP); Yasuo Yamaguchi, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 198 days.

(21) Appl. No.: 11/661,427

(22) PCT Filed: Nov. 17, 2005

(86) PCT No.: PCT/JP2005/021155

§ 371 (c)(1),
(2), (4) Date: Feb. 28, 2007

(87) PCT Pub. No.: WO2006/054661

PCT Pub. Date: May 26, 2006

(65) Prior Publication Data

US 2008/0093135 A1    Apr. 24, 2008

(30) Foreign Application Priority Data

Nov. 19, 2004    (JP) .............................. 2004-335835

(51) Int. Cl.
*H02H 7/06*     (2006.01)
*H02P 9/00*     (2006.01)
*H02P 11/00*    (2006.01)
*F16H 3/72*     (2006.01)
*F16H 37/06*    (2006.01)
*B60K 1/00*     (2006.01)
*B60K 6/00*     (2007.10)

(52) U.S. Cl. ............................ 322/33; 475/5; 180/65.2; 180/65.4

(58) Field of Classification Search ................... 322/33; 475/5; 180/65

See application file for complete search history.

(56) References Cited

U.S. PATENT DOCUMENTS

| 5,513,719 | A | * | 5/1996 | Moroto et al. | 180/65.4 |
| 5,796,195 | A | * | 8/1998 | Miyakawa | 310/68 B |
| 6,041,901 | A | * | 3/2000 | Werner et al. | 192/3.28 |
| 6,092,985 | A | * | 7/2000 | Winkam | 415/124.1 |
| 6,155,364 | A | * | 12/2000 | Nagano et al. | 180/65.2 |

(Continued)

FOREIGN PATENT DOCUMENTS

DE    69803484 T    11/2002

(Continued)

*Primary Examiner*—Nicholas Ponomarenko
*Assistant Examiner*—Pedro J Cuevas
(74) *Attorney, Agent, or Firm*—Oliff & Berridge, PLC

(57) ABSTRACT

A hybrid vehicle drive unit that includes an intermediate shaft, a starting clutch and motor generator that includes a stator that is fixed to an interior portion of a motor casing that is attached to a housing of the transmission; a rotor support member that is coupled to the clutch drum and has an inner end portion that is rotatably supported by an end wall of the motor casing and a rotor support portion that is fitted to an outer perimeter face of the clutch drum in an axial direction such that there is play between the rotor support portion and the outer perimeter face; and a rotor that is held by the rotor support portion of the rotor support member and is disposed such that an outer perimeter face of the rotor faces an inner perimeter face of the stator.

20 Claims, 4 Drawing Sheets

U.S. PATENT DOCUMENTS

| | | | |
|---|---|---|---|
| 6,208,036 B1* | 3/2001 | Evans et al. | 290/46 |
| 6,258,001 B1* | 7/2001 | Wakuta et al. | 475/5 |
| 6,340,339 B1* | 1/2002 | Tabata et al. | 475/5 |
| 6,478,101 B1* | 11/2002 | Taniguchi et al. | 180/65.2 |
| 6,492,742 B1* | 12/2002 | Fujikawa et al. | 290/40 C |
| 6,777,837 B2* | 8/2004 | Tsuzuki et al. | 310/67 R |
| 6,862,887 B2 | 3/2005 | Noreikat et al. | 60/716 |
| 6,935,450 B1* | 8/2005 | Tsuzuki et al. | 180/65.2 |
| 7,017,693 B2 | 3/2006 | Omote et al. | 180/65.2 |
| 7,363,996 B2* | 4/2008 | Kamada et al. | 180/65.2 |
| 7,396,308 B2* | 7/2008 | Tabata et al. | 475/159 |
| 2002/0036434 A1* | 3/2002 | Tsuzuki et al. | 310/83 |
| 2003/0106729 A1 | 6/2003 | Noreikat et al. | 180/65.7 |
| 2006/0102409 A1* | 5/2006 | Kamada et al. | 180/249 |
| 2006/0108162 A1* | 5/2006 | Tabata et al. | 180/65.2 |
| 2006/0166778 A1* | 7/2006 | Tabata et al. | 475/159 |
| 2007/0108857 A1* | 5/2007 | Nomura et al. | 310/78 |
| 2007/0213161 A1* | 9/2007 | Tabata et al. | 475/5 |
| 2007/0225098 A1* | 9/2007 | Tabata et al. | 475/5 |
| 2008/0121446 A1* | 5/2008 | Sanji | 180/65.2 |
| 2008/0173487 A1* | 7/2008 | Kamada et al. | 180/65.4 |

FOREIGN PATENT DOCUMENTS

| | | |
|---|---|---|
| DE | 10154147 C1 | 7/2003 |
| EP | 1 415 840 A1 | 5/2004 |
| JP | A 2000-289475 | 10/2000 |
| JP | A 2003-205756 | 7/2003 |
| JP | A 2004-1708 | 1/2004 |
| JP | A 2004-306827 | 11/2004 |
| WO | WO 03/013893 A1 | 2/2003 |

* cited by examiner

HYBRID VEHICLE DRIVE UNIT

INCORPORATION BY REFERENCE

This application is the U.S. National Stage of PCT/JP2005/021155, filed Nov. 17, 2005, which claims priority from JP2004-335835, filed Nov. 19, 2004, the entire disclosures of which are incorporated herein by reference thereto.

BACKGROUND

The present invention relates to a drive unit.

There exists a hybrid vehicle drive unit 100 in Japanese Patent Application Publication No. JP-A-2004-001708, illustrated in FIG. 4, that includes a starting clutch SC and a motor-generator MG. The starting clutch SC is attached to an intermediate shaft m that is connected to an input shaft of an automatic transmission such that the intermediate shaft m can rotate relative to the input shaft with the motor-generator MG being disposed such that it encircles the starting clutch SC and overlaps it in the axial direction. The conventional hybrid vehicle drive unit is configured such that when the motor-generator MG operates as a motor, a driving force is transmitted to the input shaft via a clutch drum SCh of the starting clutch SC. When the starting clutch SC is engaged, a driving force that is imparted to the intermediate shaft m by the engine is transmitted to the input shaft via the starting clutch SC. In the drive unit, the starting clutch SC is characterized by being structured such that it has a smaller diameter than a damper mechanism D that is installed between the engine and the intermediate shaft m and by being disposed on the inside diameter side of the motor-generator MG, which has the advantage of shortening the length of the entire unit in the axial direction.

In the drive unit described above, a rotor support member Ra, which supports a rotor R, is supported at a sleeve-shaped inner end portion Rai of the rotor support member Ra by a ball bearing BRG that is attached to an end wall Mc1 of a motor casing Mc. The rotor support member Ra is also supported by the intermediate shaft m via a roller bearing r. The clutch drum SCh of the starting clutch SC is supported, via a roller bearing r, by a pump housing OPB that is attached to an end wall of a housing of the automatic transmission via a hub portion Sco of the clutch drum SCh. A cylindrical outer perimeter portion of the clutch drum SCh is coupled to a rotor support portion of the rotor support member Ra by a spline s.

SUMMARY

In the drive unit described above, the clutch drum SCh of the starting clutch SC and the rotor support member Ra are supported in a cantilever fashion by their respective base portions, thus making it difficult to position the two members concentrically when they are coupled by the spline. Therefore, a gap g between an inner perimeter face of a stator S and an outer perimeter face of the rotor R must be made comparatively large, which makes it difficult to increase the drive efficiency of the motor-generator MG.

Also, there is concern that a lubricating oil for the starting clutch SC will flow into a motor chamber MV through the spline s and be agitated by the rotor R, thereby reducing the drive efficiency of the motor-generator MG.

The present invention thus provides, among other things, a hybrid vehicle drive unit that eliminates the problems described above by concentrically positioning (centering) an assembly unit of a motor-generator in relation to an input shaft of an automatic transmission when the assembly unit is attached to a clutch drum of a starting clutch and by reliably positioning a rotor of the assembly unit concentrically with a stator, with a specified gap between the rotor and the stator.

The present invention thus provides a hybrid vehicle drive unit that includes an intermediate shaft, a starting clutch and a motor generator. The intermediate shaft is connected to an input shaft of a transmission such that the intermediate shaft can rotate relative to the input shaft. The starting clutch includes a clutch drum, which has an output side end portion that is coupled to the input shaft of the transmission and an input side end portion that is rotatably supported by the intermediate shaft. The clutch drum accommodates a clutch mechanism that is engaged by hydraulic pressure, and the clutch drum operates as an output element that transmits to the input shaft a driving force that is imparted to the intermediate shaft by an engine when the clutch mechanism is engaged. The motor-generator includes a stator that is fixed to an interior portion of a motor casing that is attached to a housing of the transmission. The motor-generator also includes a rotor support member that is coupled to the clutch drum and has an inner end portion that is rotatably supported by an end wall of the motor casing and a rotor support portion that is fitted to an outer perimeter face of the clutch drum in an axial direction such that there is play between the rotor support portion and the outer perimeter face. The motor-generator further includes a rotor that is held by the rotor support portion of the rotor support member and is disposed such that an outer perimeter face of the rotor faces an inner perimeter face of the stator.

The present invention also provides a hybrid vehicle drum unit that includes an intermediate shaft, a starting clutch and a motor generator. The intermediate shaft is connected to an input shaft of a transmission such that the intermediate shaft can rotate relative to the input shaft. The starting clutch includes a clutch drum, which has an output side end portion that is coupled to the input shaft of the transmission and an input side end portion that is rotatably supported by the intermediate shaft. The clutch drum accommodates a clutch mechanism that is engaged by hydraulic pressure, and the clutch drum operates as an output element that transmits to the input shaft a driving force that is imparted to the intermediate shaft by an engine when the clutch mechanism is engaged. The motor-generator includes a stator that is fixed to an interior portion of a motor casing that is attached to a housing of the transmission. The motor-generator also includes a rotor support member that is coupled to the clutch drum and has an inner end portion that is rotatably supported by an end wall of the motor casing, wherein the inner end portion of the rotor support member, the intermediate shaft and the input side end portion of the clutch drum overlap in a direction perpendicular to an axial direction. The motor-generator further includes a rotor that is held by the rotor support portion of the rotor support member and is disposed such that an outer perimeter face of the rotor faces an inner perimeter face of the stator.

BRIEF DESCRIPTION OF THE DRAWINGS

Various embodiments of the invention will be described with reference to the drawings, wherein.

DETAILED DESCRIPTION OF EMBODIMENTS

An embodiment of the present invention will be explained below with reference to the drawings. A hybrid vehicle drive unit 100, shown in FIG. 1, includes an intermediate shaft m that is connected to an input shaft ATi of an automatic transmission AT such that the intermediate shaft m can rotate relative to the input shaft ATi. The hybrid vehicle drive unit 100 also includes a motor-generator MG, which is disposed such that it encircles a starting clutch SC and overlaps it in the axial direction, the starting clutch SC being attached to the intermediate shaft m and the input shaft ATi. In the drive unit 100, when the motor-generator MG operates as a motor, a driving force is transmitted to the input shaft ATi of the automatic transmission AT via a clutch drum SCh of the starting clutch SC. When the starting clutch SC is engaged, a driving force that is imparted via a damper mechanism D to the intermediate shaft m by a gasoline engine E is transmitted to the input shaft ATi via the starting clutch SC.

Figure 1:
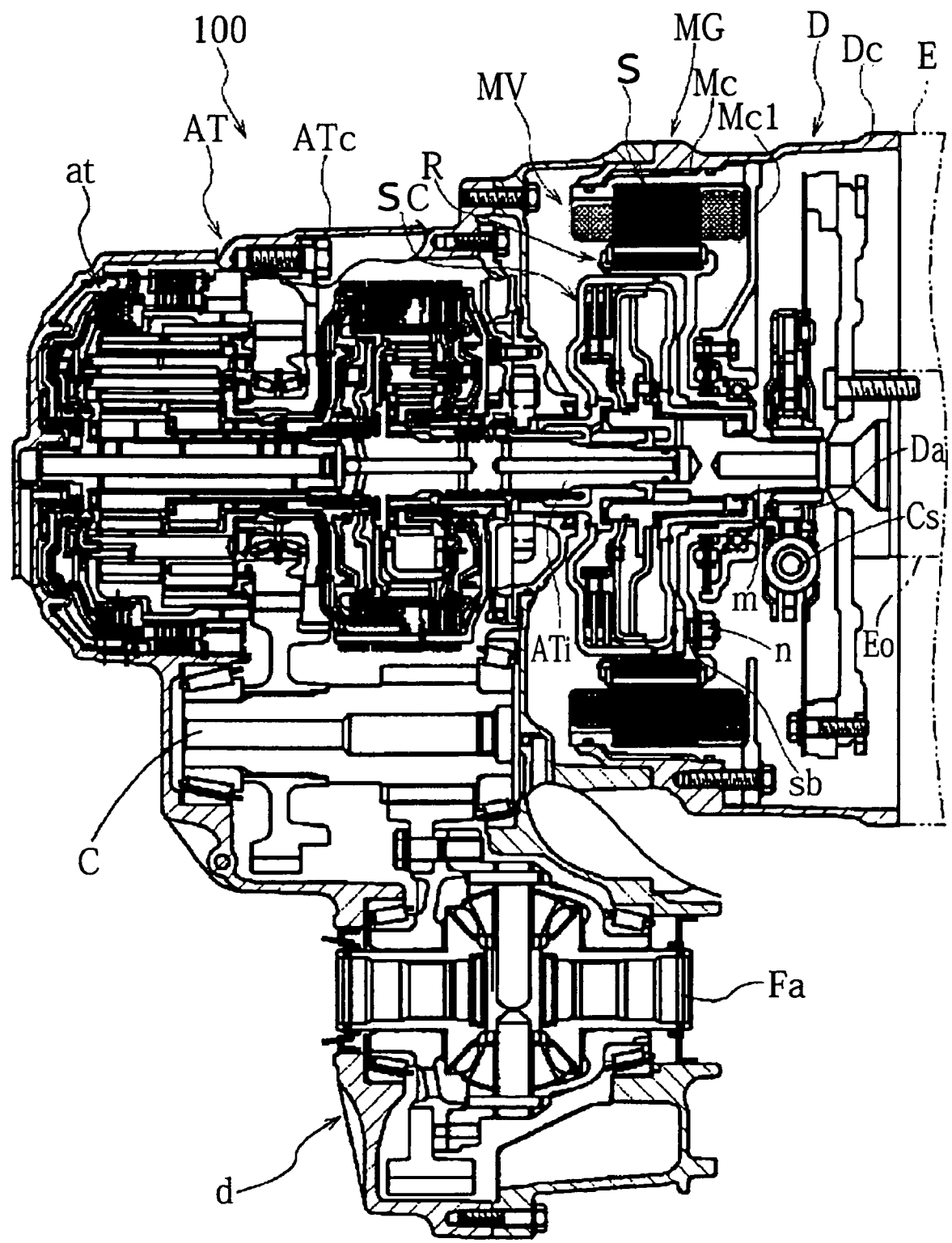
FIG. 1 is a sectional view of a hybrid vehicle drive unit according to an embodiment of the present invention.
Figure 2:
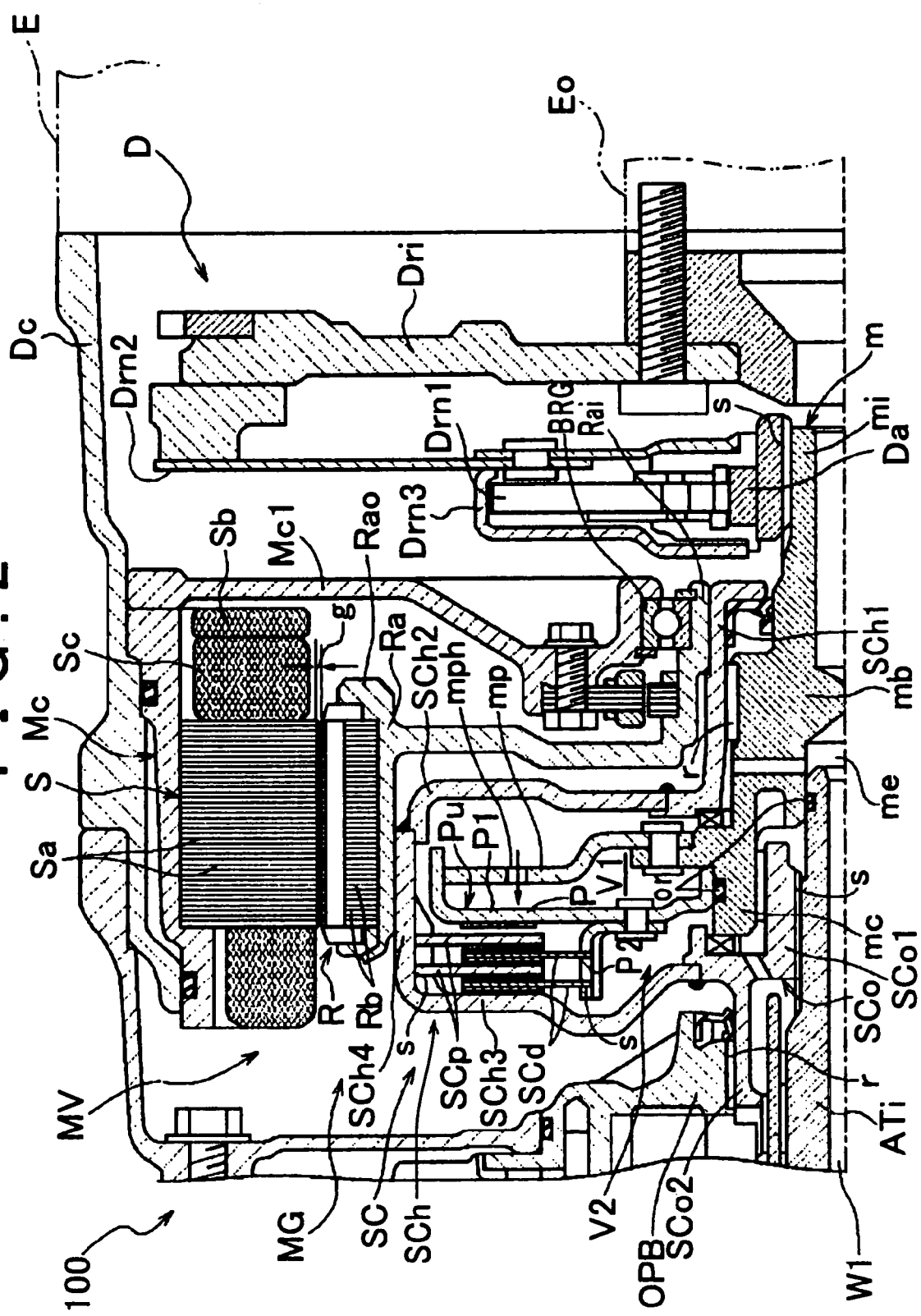
FIG. 2 is an enlarged sectional view of a structure of a starting clutch and a motor-generator in the hybrid vehicle drive unit shown in FIG. 1.

As shown in FIGS. 1 and 2, the automatic transmission AT includes, inside a housing ATc, a shift mechanism at through which the input shaft ATi passes such that it can rotate. A differential d, which is connected to a front wheel drive shaft Fa via an intermediate gear train provided on a countershaft C, is connected to an output gear of the shift mechanism at. The intermediate shaft m is coupled, via seal rings or in an inner end portion of the intermediate shaft m, to the input shaft ATi of the transmission such that the intermediate shaft m can rotate relative to the input shaft ATi. An oil hole W1 in the axial center of the input shaft ATi communicates with an interior hole me that is formed in a large diameter portion mb of the intermediate shaft m. The intermediate shaft m is connected to a crankshaft Eo of the engine E via the damper mechanism D, which is attached to an outer end portion mi of the intermediate shaft m.

As shown in FIGS. 1 and 2, the damper mechanism D includes a driven member Drn1 and a driven plate Drn3. The driven member Drn1 is assembled into a single piece with a boss portion Da, which is coupled by a spline s to the outer end portion mi of the intermediate shaft m. The driven plate Drn3 is assembled into a single piece with a driven plate Drn2. The driven plate Drn2 is fastened to an outer perimeter edge portion of a drive plate Dri, which is fixed to the crankshaft Eo. Next, the driven member Drn1 is positioned between the driven plates Drn2 and Drn3, and a coil spring Cs is interposed between the driven member Drn1 and the driven plates Drn2, Drn3. In the damper mechanism D, when the driving force of the engine E is imparted to the intermediate shaft m, the coil spring Cs is compressed and absorbs the shock on the intermediate shaft m.

The starting clutch SC includes the clutch drum SCh and a wet multiple disc clutch mechanism Pu that is provided inside the clutch drum Sch. The clutch drum SCh is made up of an input side cylindrical end portion SCh1, an input side member SCh2, and an output side member SCh3. The input side member SCh2 holds the cylindrical end portion SCh1, which is supported by the large diameter portion mb of the intermediate shaft m via a roller bearing r. The output side member SCh3 is joined into a single piece with the input side member SCh2. The output side member SCh3 also holds a sleeve-shaped output side end portion SCo1, which is joined to the input shaft ATi of the transmission by a spline s, and a hub portion SCo2 that is supported by a pump housing OPB via a roller bearing r such that it rotates freely. The pump housing OPB is joined into a single piece with an end wall of the housing ATc of the transmission.

The wet multiple disc clutch mechanism Pu includes a ring-shaped partition plate mp, a piston P1, a plurality of inner side friction plates SCd, and a plurality of outer side friction plates SCp. The partition plate mp is fixed to a boss portion mc of the intermediate shaft m. The piston P1 is also joined to the boss portion mc such that the piston P1 can move in the axial direction. The inner side friction plates SCd are attached to a support member P2, which is joined into a single piece with the piston P1. The outer side friction plates SCp are interposed between the inner side friction plates SCd and are joined by a spline s to an inner perimeter face of a cylindrical outer perimeter portion SCh4 of the output side member SCh3 such that the outer side friction plates SCp can move in the axial direction. Inside the clutch drum SCh, hydraulic chambers V1, V2 are formed such that the piston P1 separates them. In the starting clutch SC, oil is supplied under pressure to the hydraulic chamber V1 in response to the shift operation of the transmission. The clutch mechanism Pu is engaged by the discharge of the hydraulic fluid in the hydraulic chamber V2. The driving force that is imparted to the intermediate shaft m by the engine crankshaft Eo via the damper mechanism D is transmitted to the input shaft ATi of the transmission via the clutch drum SCh.

The motor-generator MG is a brushless DC motor made up of a ring-shaped stator S, which is fixed to an inner perimeter wall of a motor casing Mc, and a rotor R, which is held by a cylindrical portion Rao of a rotor support member Ra. The stator S is made up of a coil Sc that is wound around a stator iron core Sa that is made of laminated plates and fixed to the inner perimeter wall of the motor casing Mc. A shield plate Sb is installed around the coil Sc to block magnetic leakage flux. In the stator S, when electric current flows to the coil Sc, a magnetic flux is formed in a closed loop formed by the coil Sc, the shield plate Sb, and the stator iron core Sa. Leakage of the magnetic flux is blocked by the shield plate Sb. The rotor R is made of laminated plates Rb, in which a permanent magnet is embedded, and is fixed to the cylindrical portion Rao of the rotor support member Ra such that an outer perimeter face of the rotor R faces an inner perimeter face of the stator S across a gap g. As shown in FIG. 2, the cylindrical portion Rao (as an example of a rotor support portion) of the rotor support member Ra is fitted to an outer perimeter face of the cylindrical outer perimeter portion SCh4 of the clutch drum SCh in the axial direction, with a slight gap between them and, as shown in FIG. 3, is fixed to the clutch drum SCh by a nut n, which is tightened by a stud bolt Sb that is welded to the input side member SCh2 of the clutch drum.

The motor-generator MG, configured as described above, operates as a motor in which the rotor R rotates when electric current flows to the coil Sc of the stator S from a fuel cell (not shown) under the control of a controller that is not shown. The motor-generator MG also operates as a generator when the rotor R is driven by the driving force of the engine E via the rotor support member Ra and the clutch drum SCh, thereby playing the role of charging the fuel cell.

Figure 3:
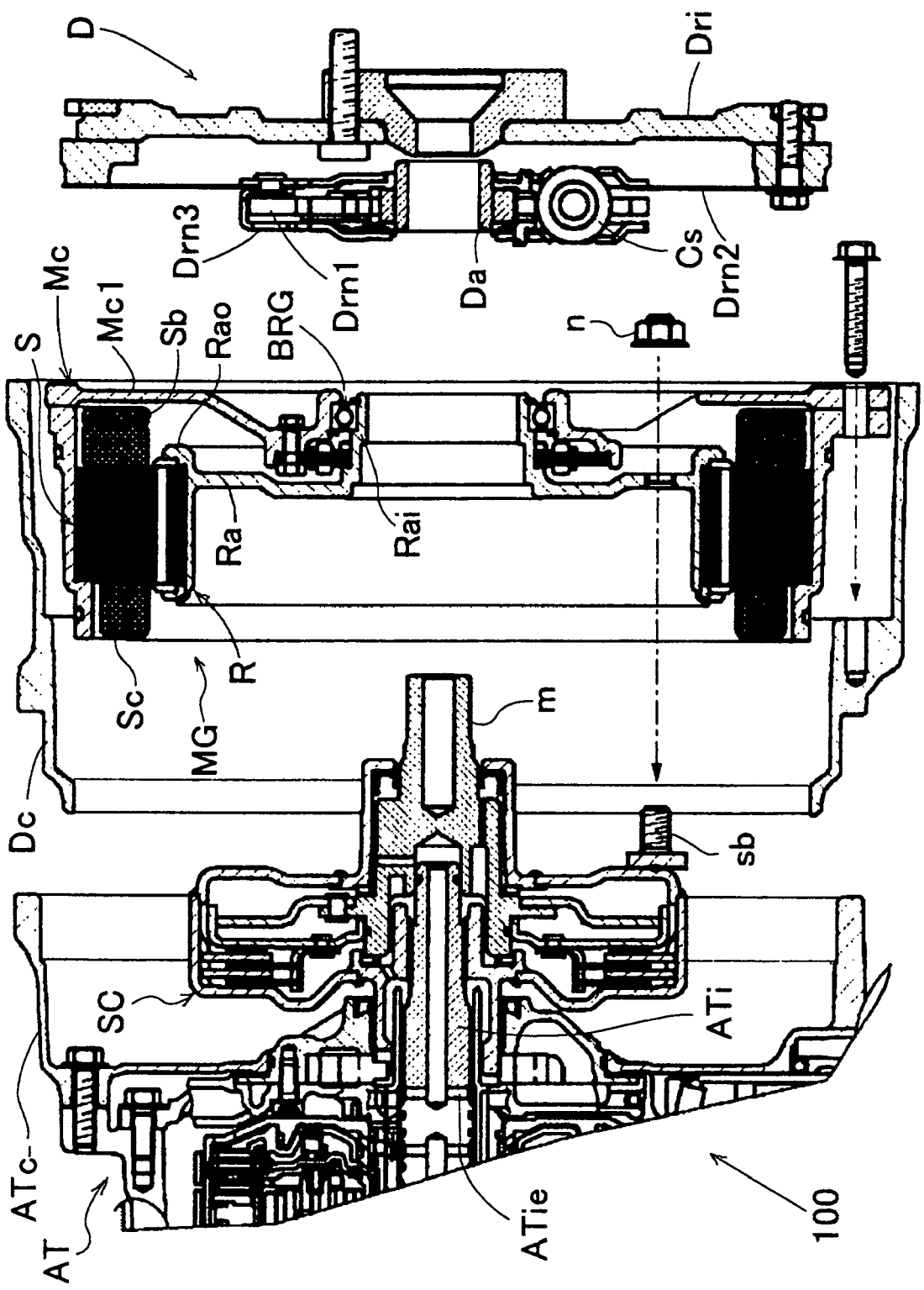
FIG. 3 is a sectional view of a motor-generator and damper structure in a state of separation from the starting clutch in the hybrid vehicle drive unit shown in FIG. 1.
Figure 4:
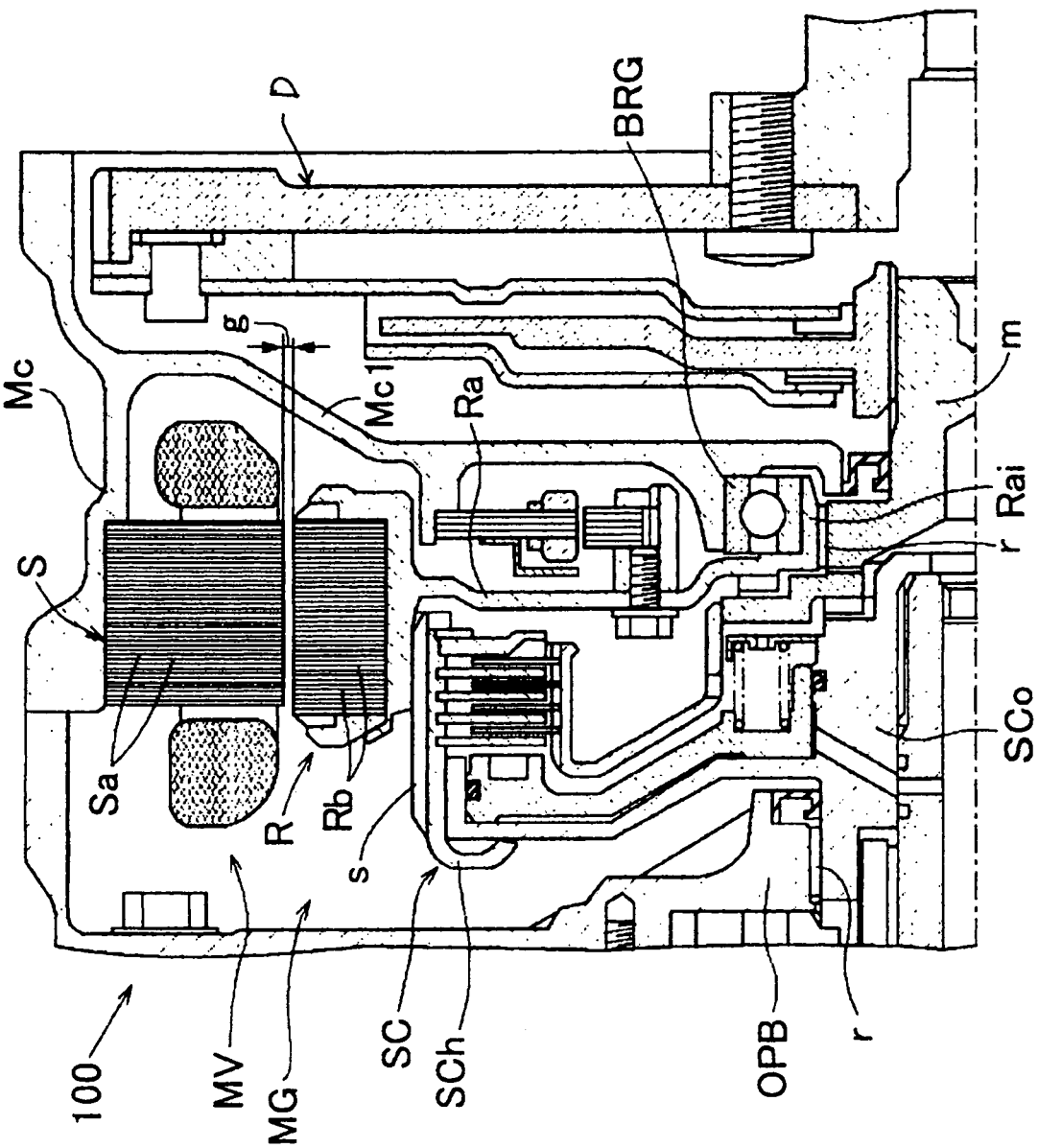
FIG. 4 is a sectional view of a conventional hybrid vehicle drive unit.

In the assembly process for the drive unit according to the present invention, as shown in FIG. 3, the input shaft ATi and the intermediate shaft m are attached to opposite ends of the starting clutch SC, with the intermediate shaft m being connected to the input shaft ATi of the automatic transmission AT such that the intermediate shaft m can rotate relative to the input shaft ATi. In the assembly process, the input side member SCh2 of the clutch drum SCh is supported at the input side cylindrical end portion SCh1 via the roller bearing r such that the input side member SCh2 is concentric with the intermediate shaft m. The motor-generator MG is mounted inside the motor casing Mc. In the assembly process, the stator S is fixed to the inner perimeter wall of the motor casing Mc to form a single piece with the motor casing Mc. The rotor support member Ra is supported, via a ball bearing BRG at a sleeve-shaped inner end portion Rai of the rotor support member Ra, by an end wall Mc1 of the motor casing Mc, such that the rotor support member Ra can rotate concentrically with the stator S. Thus, the rotor R, which is held by the cylindrical portion Rao of the rotor support member Ra, is mounted such that the outer perimeter face of the rotor R faces the inner perimeter face of the stator S across a specified gap g.

The motor casing Mc, inside of which the motor-generator MG is mounted as described above, is assembled such that it is fitted inside of an intermediate housing Dc, which is connected to the engine E, and is connected to and forms a single piece with the transmission housing ATc via a connecting end portion of the intermediate housing Dc. In the assembly process, the cylindrical portion Rao of the rotor support member Ra is fitted to the cylindrical outer perimeter portion SCh4 of the clutch drum SCh such that there is play in the axial direction between the cylindrical portion Rao and the cylindrical outer perimeter portion SCh4. At this time, the sleeve-shaped inner end portion Rai of the rotor support member Ra, which is supported by the end wall Mc1 of the motor casing Mc via the ball bearing BRG, is fitted to the cylindrical end portion SCh1 of the input side member SCh2, which is a part of the clutch drum SCh, such that the sleeve-shaped inner end portion Rai can rotate relative to the cylindrical end portion SCh1 and is positioned concentrically with the intermediate shaft m, which is coupled to the transmission input shaft ATi. At the same time, the sleeve-shaped inner end portion Rai is supported by the intermediate shaft m via the cylindrical end portion SCh1 of the clutch drum SCh, at a position that is removed from the ball bearing BRG (which is an example of a support portion) at the end wall of the motor casing Mc. In other words, the sleeve-shaped inner end portion Rai, the intermediate shaft m and the cylindrical end portion SCh1 of the clutch drum SCh overlap in a direction perpendicular to the axial direction. At this time, the stud bolt Sb, which is welded to the input side member SCh2 of the clutch drum SCh, protrudes through a through-hole that is provided in the rotor support member Ra, so tightening the nut n on the stud bolt Sb fixes the rotor support member Ra to the clutch drum SCh. Next, the assembly of the drive unit 100 according to the present invention is completed by mounting the damper mechanism D on the outer end portion mi of the intermediate shaft m, which protrudes from the sleeve-shaped inner end portion Rai of the rotor support member Ra.

In a vehicle in which the drive unit according to the present invention, assembled as described above, is installed, when a driver turns on the vehicle ignition switch, shifts the transmission AT from the Park range to the Drive range, and steps on the accelerator pedal, electric current flows from the fuel cell (not shown) to the stator coil Sc of the motor-generator MG under the control of a controller (not shown), the rotor R rotates, and the motor-generator MG operates as a motor. This causes the driving force of the motor-generator MG to be transmitted to the input shaft ATi of the transmission AT via the rotor support member Ra, which rotates as a single piece with the rotor R, and via the output side member SCh3 of the clutch drum. In the transmission AT, a low speed gear train of the shift mechanism operates, and the vehicle starts moving at low speed. At this time, the starting clutch SC is in a disengaged state, and the engine E is maintained in a stopped state. If the running speed of the vehicle increases due to the accelerator pedal being depressed, a switching valve (not shown), which is provided in the transmission AT, is switched under the control of the controller in response to a signal from a speed sensor (not shown), causing hydraulic fluid, which is supplied by a hydraulic pump that is provided in the transmission AT, to flow into the hydraulic chamber V1 of the starting clutch SC through the oil hole W1 in the input shaft ATi. This causes the piston P1 of the clutch mechanism to move, engaging the starting clutch SC, so that the driving force of the motor-generator MG is transmitted to the intermediate shaft m.

At this time, the engine E is started by the driving force that is imparted by the intermediate shaft m via the damper mechanism D. In this operating mode, the driving force of the motor-generator MG is transmitted to the input shaft ATi of the automatic transmission AT, and the driving force of the engine E is transmitted to the input shaft ATi of the automatic transmission AT via the damper mechanism D, the intermediate shaft m, and the starting clutch SC.

If, while the vehicle is traveling, the shift mechanism of the transmission AT is shifted up by the depressing of the accelerator pedal, so that the vehicle shifts to high-speed driving, the electric power supply to the motor-generator MG is cut off under the control of the controller in response to the shifting operation of the shift mechanism, and the motor-generator MG stops. Therefore, the vehicle is driven by the driving force of the engine E, and the motor-generator MG operates as a generator whose electromotive force charges the fuel cell. When the vehicle is stopped by the depressing of the brake pedal, the engine E stops under the control of the controller. When the vehicle starts moving again, the motor-generator MG operates as a motor, in the same manner as in the starting operation described above, such that the input shaft ATi of the transmission AT is rotated by the driving force of the motor-generator MG, and the vehicle starts moving at low speed.

Thus, a vehicle in which the drive unit according to the present invention is installed starts moving without causing the engine E to idle while the vehicle is stopped, and when the vehicle reaches a running speed at which fuel efficiency is good, it runs on the driving force of the engine E. Therefore, the drive unit according to the present invention is extremely useful for reducing the discharge of exhaust emissions when the vehicle starts moving and when the vehicle is running at low speed and for increasing the fuel efficiency of the engine E.

As is understood from the detailed explanation of the embodiment of the present invention above, the hybrid vehicle drive unit according to the present invention is characterized by being structured such that the sleeve-shaped inner end portion Rai of the rotor support member Ra is fitted into and positioned concentrically with the cylindrical end portion SCh1 on the input side of the clutch drum SCh when the motor casing Mc is fitted into and assembled with the housing ATc of the automatic transmission AT, the sleeve-shaped inner end portion Rai also being supported by the intermediate shaft m via the cylindrical end portion SCh1 of the clutch drum SCh, at a position that is removed from the ball bearing BRG at the end wall Mc1 of the motor casing. Therefore, when the assembled unit of the motor-generator MG is assembled with the clutch drum of the starting clutch, the assembled unit is positioned concentrically with the input shaft ATi of the automatic transmission, and when the rotor support member Ra of the unit is fixed to the input side member SCh2 of the clutch drum SCh, the outer perimeter face of the rotor R is reliably positioned concentrically such that it faces the inner perimeter face of the stator S across the specified gap g.

The invention claimed is:

1. A hybrid vehicle drive unit, comprising:
an intermediate shaft that is connected to an input shaft of a transmission such that the intermediate shaft can rotate relative to the input shaft;
a starting clutch that includes a clutch drum, which has an output side end portion that is coupled to the input shaft of the transmission and an input side end portion that is rotatably supported by the intermediate shaft, wherein the clutch drum accommodates a clutch mechanism that is engaged by hydraulic pressure, and the clutch drum operates as an output element that transmits to the input shaft a driving force that is imparted to the intermediate shaft by an engine when the clutch mechanism is engaged; and
a motor-generator that includes:
a stator that is fixed to an interior portion of a motor casing that is attached to a housing of the transmission;
a rotor support member that is coupled to the clutch drum and has an inner end portion that is rotatably supported by an end wall of the motor casing and a rotor support portion that is fitted to an outer perimeter face of the clutch drum in an axial direction such that there is play between the rotor support portion and the outer perimeter face; and
a rotor that is held by the rotor support portion of the rotor support member and is disposed such that an outer perimeter face of the rotor faces an inner perimeter face of the stator.

2. The hybrid vehicle drive unit according to claim 1, wherein:
when the motor casing is attached to the housing of the transmission, the inner end portion of the rotor support member is fitted in the axial direction to and positioned concentrically with the input side end portion of the clutch drum; and
the inner end portion of the rotor support member is supported by the intermediate shaft via the input side end portion of the clutch drum at a position removed in the axial direction from a support portion at the end wall of the motor casing.

3. The hybrid vehicle drive unit according to claim 1, wherein:
the clutch drum has the output side end portion that is rotatably supported by an end wall of the housing of the transmission and is coupled to the input shaft of the transmission, and the clutch drum has the input side end portion that is rotatably supported by the intermediate shaft;
the rotor support member has the inner end portion that is rotatably supported by the end wall of the motor casing, and the rotor support portion that is fitted to the outer perimeter face of the clutch drum in the axial direction; and
when the motor casing is joined and attached to the housing of the transmission, the inner end portion of the rotor-support member is fitted in the axial direction to and positioned concentrically with the input side end portion of the clutch drum.

4. The hybrid vehicle drive unit according to claim 1, wherein:
the motor-generator is attached concentrically to the input side end portion of the clutch drum and is configured as a single unit that includes:
the stator that is fixed to the interior portion of the motor housing and that is attached to the housing of the transmission such that the cylindrical stator encircles the clutch drum;
the rotor support member that is fixed to the clutch drum and has the inner end portion that is rotatably supported by the end wall of the motor casing, and the rotor support portion is fitted to the outer perimeter face of the clutch drum in the axial direction; and
the rotor that is held by the rotor support portion of the rotor support member and is disposed such that the outer perimeter face of the rotor faces the inner perimeter face of the stator across a specified gap.

5. The hybrid vehicle drive unit according to claim 1, wherein:
when the motor casing is attached to the housing of the transmission, the inner end portion of the rotor support member is fitted in the axial direction to and positioned concentrically with the input side end portion of the clutch drum;
the inner end portion of the rotor support member is supported by the intermediate shaft via the input side end portion of the clutch drum at a position removed in the axial direction from a support portion at the end wall of the motor casing; and
the outer perimeter face of the rotor faces the inner perimeter face of the stator across a specified gap.

6. The hybrid vehicle drive unit according to claim 1, wherein:
the clutch mechanism is a wet friction clutch mechanism that is configured from an input side friction plate that rotates as a single piece with the intermediate shaft, an output side friction plate that rotates as a single piece with the clutch drum, and a hydraulic piston that presses the input side friction plate against the output side friction plate.

7. The hybrid vehicle drive unit according to claim 2, wherein:
the clutch drum is rotatably fitted onto the intermediate shaft in a liquid-tight manner; and
a hydraulic piston operates when a hydraulic fluid is supplied to hydraulic chambers that are formed in an interior portion of the clutch drum such that the hydraulic piston separates them, through a portion where the input shaft and the intermediate shaft are coupled.

8. The hybrid vehicle drive unit according to claim 1, wherein the rotor support member is disposed such that the clutch drum is accommodated on an inner side of the rotor support portion.

9. The hybrid vehicle drive unit according to claim 1, wherein
a damper mechanism is provided on an outer end portion of the intermediate shaft for absorbing a shock of the driving force that is transmitted from the engine.

10. The hybrid vehicle drive unit according to claim 1, wherein the inner end portion of the rotor support member, the intermediate shaft and the input side end portion of the clutch drum overlap in a direction perpendicular to the axial direction.

11. A hybrid vehicle drive unit, comprising:

an intermediate shaft that is connected to an input shaft of a transmission such that the intermediate shaft can rotate relative to the input shaft;

a starting clutch that includes a clutch drum, which has an output side end portion that is coupled to the input shaft of the transmission and an input side end portion that is rotatably supported by the intermediate shaft, wherein the clutch drum accommodates a clutch mechanism that is engaged by hydraulic pressure, and the clutch drum operates as an output element that transmits to the input shaft a driving force that is imparted to the intermediate shaft by an engine when the clutch mechanism is engaged; and a motor-generator that includes:

a stator that is fixed to an interior portion of a motor casing that is attached to a housing of the transmission;

a rotor support member that is coupled to the clutch drum and has an inner end portion that is rotatably supported by an end wall of the motor casing, wherein the inner end portion of the rotor support member, the intermediate shaft and the input side end portion of the clutch drum overlap in a direction perpendicular to an axial direction; and a rotor that is held by the rotor support portion of the rotor support member and is disposed such that an outer perimeter face of the rotor faces an inner perimeter face of the stator.

12. The hybrid vehicle drive unit according to claim 11, wherein:

when the motor casing is attached to the housing of the transmission, the inner end portion of the rotor support member is fitted in the axial direction to and positioned concentrically with the input side end portion of the clutch drum; and the inner end portion of the rotor support member is supported by the intermediate shaft via the input side end portion of the clutch drum at a position removed in the axial direction from a support portion at the end wall of the motor casing.

13. The hybrid vehicle drive unit according to claim 11, wherein:

the clutch drum has the output side end portion that is rotatably supported by an end wall of the housing of the transmission and is coupled to the input shaft of the transmission, and the clutch drum has the input side end portion that is rotatably supported by the intermediate shaft;

the rotor support member has the inner end portion that is rotatably supported by the end wall of the motor casing, and a rotor support portion that is fitted to an outer perimeter face of the clutch drum in the axial direction; and when the motor casing is joined and attached to the housing of the transmission, the inner end portion of the rotor support member is fitted in the axial direction to and positioned concentrically with the input side end portion of the clutch drum.

14. The hybrid vehicle drive unit according to claim 11, wherein:

the motor-generator is attached concentrically to the input side end portion of the clutch drum and is configured as a single unit that includes:

the stator that is fixed to the interior portion of the motor housing and that is attached to the housing of the transmission such that the cylindrical stator encircles the clutch drum;

the rotor support member that is fixed to the clutch drum and has the inner end portion that is rotatably supported by the end wall of the motor casing, and the rotor support portion is fitted to an outer perimeter face of the clutch drum in the axial direction; and the rotor that is held by a rotor support portion of the rotor support member and is disposed such that the outer perimeter face of the rotor faces the inner perimeter face of the stator across a specified gap.

15. The hybrid vehicle drive unit according to claim 11, wherein:

when the motor casing is attached to the housing of the transmission, the inner end portion of the rotor support member is fitted in the axial direction to and positioned concentrically with the input side end portion of the clutch drum;

the inner end portion of the rotor support member is supported by the intermediate shaft via the input side end portion of the clutch drum at a position removed in the axial direction from a support portion at the end wall of the motor casing; and the outer perimeter face of the rotor faces the inner perimeter face of the stator across a specified gap.

16. The hybrid vehicle drive unit according to claim 11, wherein:

the clutch mechanism is a wet friction clutch mechanism that is configured from an input side friction plate that rotates as a single piece with the intermediate shaft, an output side friction plate that rotates as a single piece with the clutch drum, and a hydraulic piston that presses the input side friction plate against the output side friction plate.

17. The hybrid vehicle drive unit according to claim 12, wherein:

the clutch drum is rotatably fitted onto the intermediate shaft in a liquid-tight manner; and a hydraulic piston operates when a hydraulic fluid is supplied to hydraulic chambers that are formed in an interior portion of the clutch drum such that the hydraulic piston separates them through a portion where the input shaft and the intermediate shaft are coupled.

18. The hybrid vehicle drive unit according to claim 11, wherein the rotor support member is disposed such that the clutch drum is accommodated on an inner side of the rotor support portion.

19. The hybrid vehicle drive unit according to claim 11, wherein a damper mechanism is provided on an outer end portion of the intermediate shaft for absorbing a shock of the driving force that is transmitted from the engine.

20. The hybrid vehicle drive unit according to claim 11, wherein the rotor support member includes a rotor support portion that is fitted to an outer perimeter face of the clutch drum in the axial direction.

* * * * *